J. A. Howe.
Mode of Securing Port Stoppers.

Nº 43,584. Patented Jul. 19, 1864.

Witnesses,
J. W. Coombs
Henry Morris

Inventor,
J. A. Howe
per Munn & Co
Attorneys

UNITED STATES PATENT OFFICE.

JOEL A. HOWE, OF BANGOR, MAINE.

IMPROVED DEVICE FOR SECURING THE PORT-STOPPERS OF SHIPS.

Specification forming part of Letters Patent No. 43,584, dated July 19, 1864.

*To all whom it may concern:*

Be it known that I, JOEL A. HOWE, of Bangor, in the county of Penobscot and State of Maine, have invented a new and Improved Mode of Securing the Port-Stoppers of Ships and Other Vessels; and I do hereby declare that the following is a full, clear, and exact description thereof, which will enable any person skilled in the art to make and use the same, reference being had to the accompanying drawings, forming a part of this specification, in which—

Figure 1:
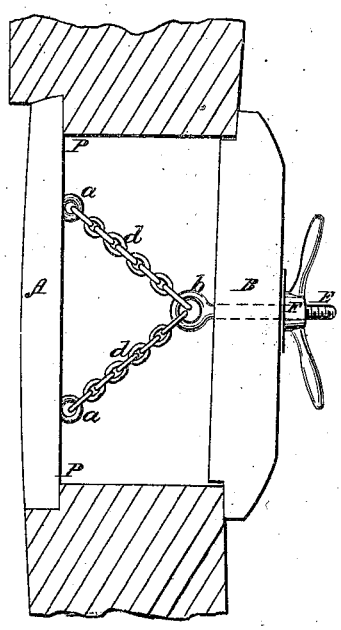
Figure 3:
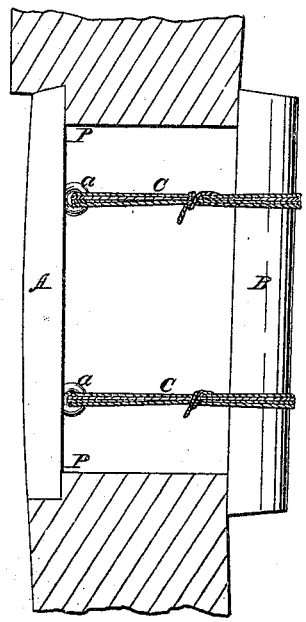
Figure 2:
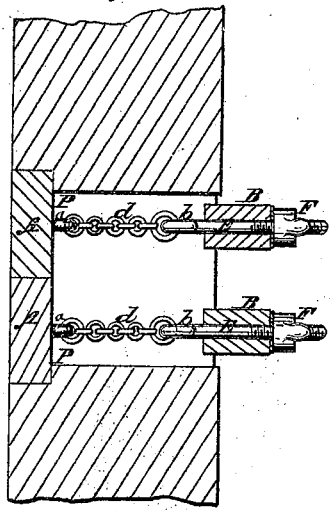

Figure 1 is a vertical section of a port having my improved mode of securing the port-stopper applied. Fig. 2 is a horizontal section of the same. Fig. 3 is a vertical section of a port having the stopper secured in the manner heretofore commonly used.

Similar letters of reference indicate corresponding parts in the several figures.

The ordinary mode of securing the port-stoppers of vessels is by means of bars B, placed across the inside of the port P, and cords C, passed round the said bars and through eyes $a$, secured in the stopper A, as shown in Fig. 3. These cords, owing to their shrinkage and stretching with different degrees of the moisture of the cargo, are liable to become slack, and the stopper is then permitted to get loosened by the working of the ship and to leak, and in many instances, when the ship is loaded, it is difficult to get at it to tighten it. This is especially the case when a vessel has been loaded with wet lumber, and this cargo taken out and a dry cargo put in.

The object of my invention is to prevent the loosening of the stopper from any such causes; and to this end it consists in the substitution for the cord of a screw-and-chain connection of peculiar construction between the stopper and the bar which is placed across the interior of the port.

In carrying out my invention the port-stopper A may be made in two parts and fitted to the port P in the usual manner, as shown in Fig. 2, and each part be secured by a separate bar, B, which has a hole bored through it for the passage of the screw E. The head of this screw, which is on the outboard side of the bar, is made with an eye, $b$, for the attachment of two chains, $d\ d$, which are connected with the eyes $a\ a$ of the stopper A, and the said screw is fitted on the inboard side of the bar with a nut, F, for drawing in the screw and tightening the chains, and thereby securing the port firmly in place. The port thus secured may be calked in the usual manner, and when once tight will remain so.

To take out the stopper, the nuts F are taken off the screws E, and the bars B removed, when the stopper may be removed in the usual manner, the screw remaining attached to it by the chains; or the screw may be slackened and the bolt started back sufficiently to admit of unhooking the chains from the stopper. The latter may then be taken out, leaving the chains and bolt attached to the bar B.

What I claim as my invention, and desire to secure by Letters Patent, is—

The combination of the port-stopper A, double chains $d\ d$, screw E, nut F, and bar B, when constructed, arranged, and employed in the manner herein specified.

JOEL A. HOWE.

Witnesses:
SAMUEL F. HUMPHREY,
H. D. HADLOCK.